July 10, 1962     E. B. GRAY ET AL     3,043,563
TURBINE ROTOR MOUNTING

Filed April 16, 1957     2 Sheets-Sheet 1

INVENTORS.
EUGENE B. GRAY
CHESTER C. DE PEW
BY
THEIR ATTORNEY.

July 10, 1962  E. B. GRAY ET AL  3,043,563
TURBINE ROTOR MOUNTING
Filed April 16, 1957  2 Sheets-Sheet 2
FIG. 3
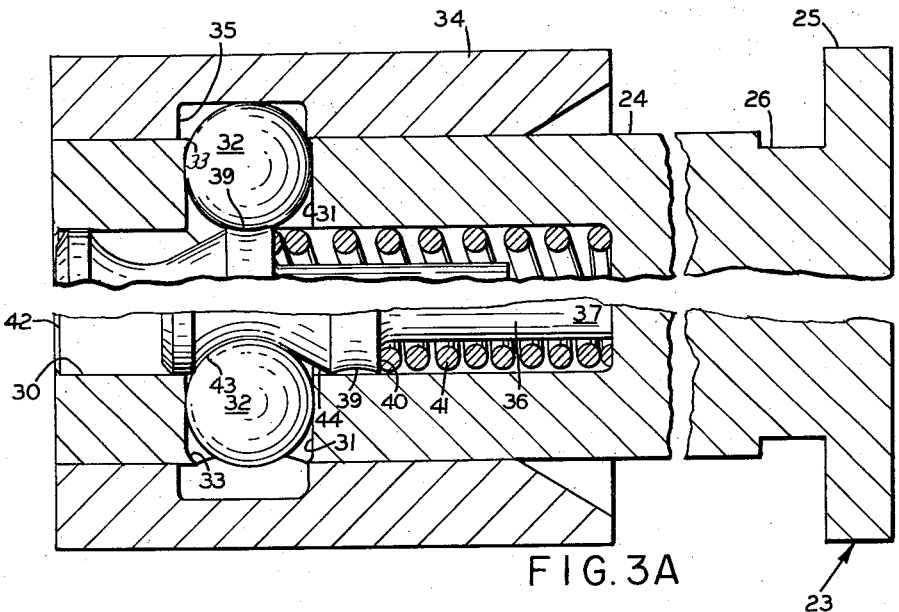
FIG. 3A
FIG. 4
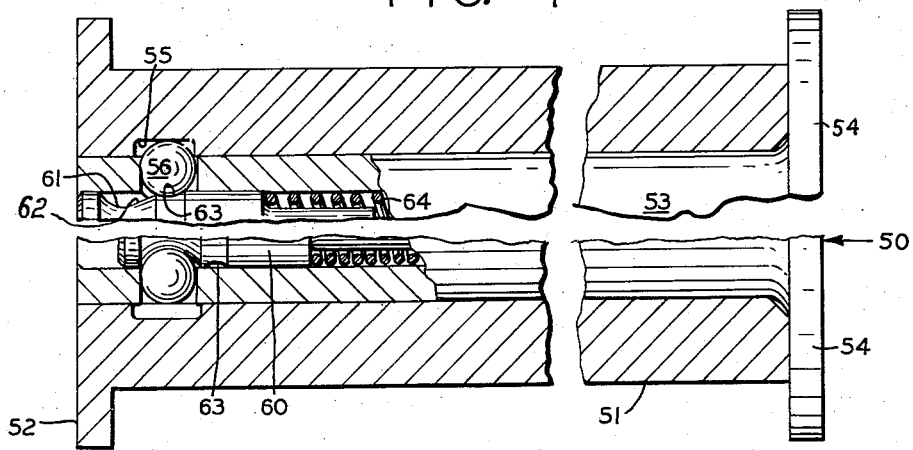
FIG. 4A
INVENTORS.
EUGENE B. GRAY
CHESTER C. DE PEW
BY:
John P. Chandler
THEIR ATTORNEY.

United States Patent Office 3,043,563
Patented July 10, 1962

3,043,563
TURBINE ROTOR MOUNTING
Eugene B. Gray, Wilton, Conn., and Chester C. De Pew, Farmingdale, N.Y., assignors, by mesne assignments, to Aerpat A.G., Glarus, Switzerland, a corporation of Switzerland
Filed Apr. 16, 1957, Ser. No. 653,150
4 Claims. (Cl. 253—77)

This invention relates to means for mounting compressor and turbine rotor blades and their spacers in an aircraft compressor turbine type engine.

An important object of the invention is to provide a novel attaching means for securing rotor vanes, compressor blades and blade spacers to the rotors of jet engines in such a manner that it is easy to assemble and disassemble the removable parts, which employ no threaded bolts or rivets which must be headed, and which serves all the useful purposes of a rivet without any of the disadvantages.

The turbine and compressor blades on jet engines must be removed from time to time for examination, replacement or repairs. Heretofore rivets have been used as the attaching means and when the blade must be removed it is necessary to destroy the rivet and this sometimes causes the blade itself to be damaged or destroyed.

The novel arrangement of the present invention simplifies the initial installation of the blades and facilitates their removal for inspection or repairs.

A more general object of the invention is to provide a novel detachable abutment for the shank end of a stud wherein balls are employed to retain the abutment or sleeve on the shank and when in fastened position the balls resist shearing action and thus prevent sliding movement of the sleeve.

An important object of the invention is to provide a stud for attaching turbine and compressor blades, said stud having greater strength in tension than rivets and having readily releasable positive locking means between an unthreaded stud shank and a threadless abutment which functions in substantially the same capacity as a conventional nut on a threaded bolt or an upset head on a rivet except that the attachment and release is effected instantaneously and locking action is effected by lock balls which are movable into mating recesses between shank and abutment. Relative movement between the parts is impossible because the lock balls are positively held captive in their pockets and a shearing of the balls, which would be necessary if the abutment were to move, is a virtual impossibility. In tension it has been found that the pin of the present invention has almost twice the strength of the conventional rivet.

Another object of the invention is to provide means in a plunger operated ball detent stud for positively holding the detent balls, which resist shearing action, in an intermediate position between the stud and the recess of an abutment sleeve.

The improved means of the present invention include two annular recesses in the plunger which holds the balls in extended position. One of these recesses is shallow and retains the balls in the extended locking position. The other recess is deeper and is of sufficient depth to permit the balls to locate wholly inside the periphery of the stud so that the sleeve can be removed. By forming this first and more shallow recess for the balls in extended or locking position there is a more positive locking action than has been provided heretofore in ball detent studs and the sleeve or abutment cannot be dislodged by shocks or vibration, no matter how severe.

In the drawings:

FIGS. 3 and 3A are sections taken through a pin of the present invention for mounting the spacer element in locking and releasing positions respectively.

FIGS. 4 and 4A are similar sections through a pin for securing the compressor blades.

Figure 1:
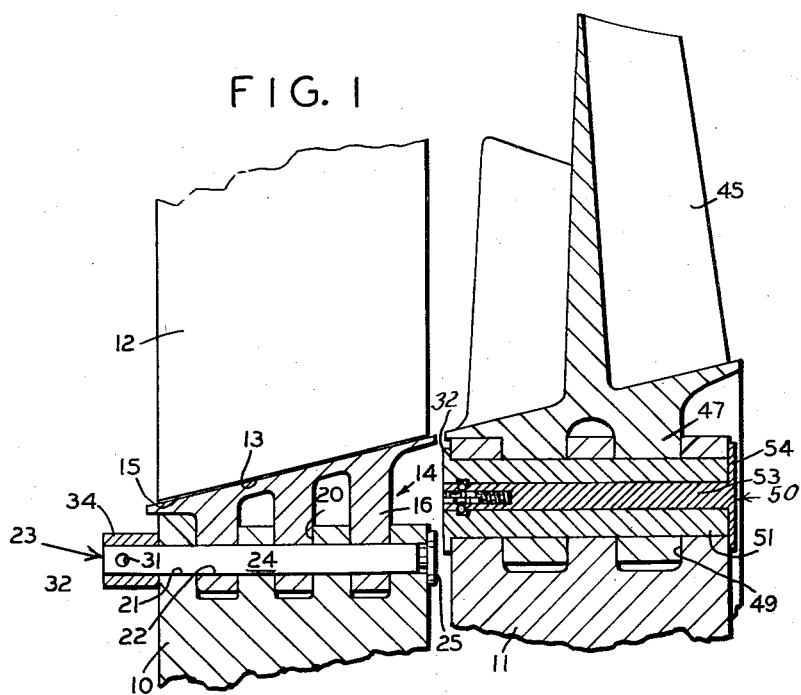
FIG. 1 is a broken section taken through a conventional type of jet engine compressor rotor and showing two side-by-side rotor wheels, one carrying a spacer member and the other a compressor blade, the section being taken on line 1—1 of FIG. 2.
Figure 2:
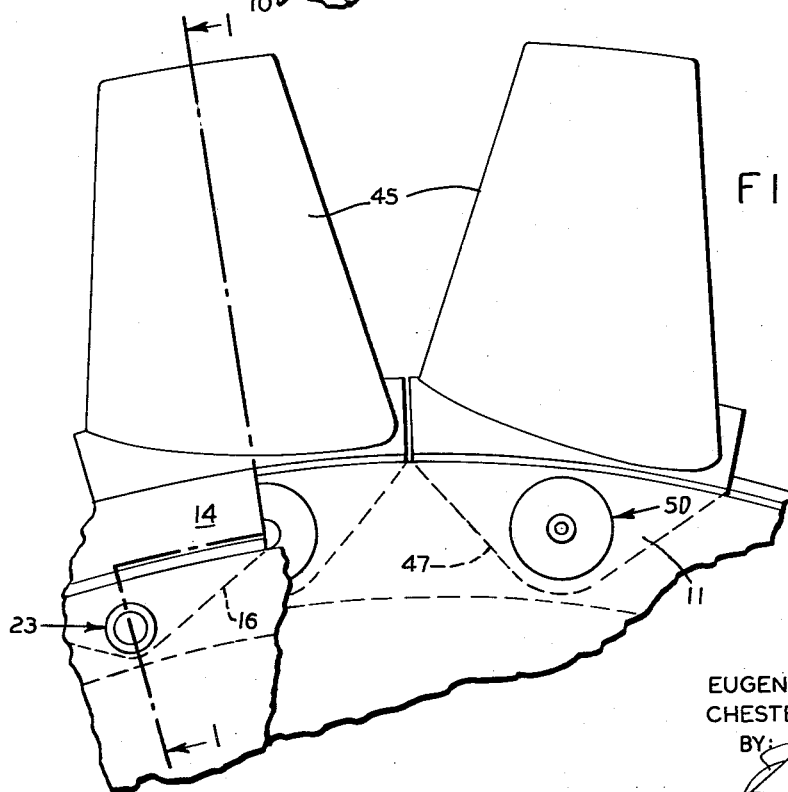
FIG. 2 is a broken front elevation of the structure shown in FIG. 1.

Referring now more particularly to FIGS. 1 and 2, a spacer mounting wheel is shown at 10 and a blade mounting wheel at 11, both of which are mounted for conjoint rotation on a shaft (not shown). The structure shown at 12 is a stationary guide vane and is formed with a diagonally inclined edge 13. The opening between this edge and the rotor is substantially closed by the spacer member 14 whose outer edge 15 is closely spaced from edge 13. The spacer member 14 is formed with a plurality of axially spaced fingers 16 extending radially inwardly which are received in close fitting relation in spaced recesses 20 on the outer periphery of rotor 10. The rotor and the spacer member have aligned openings which receive the mounting pin 23 shown in detail in FIG. 3.

The spacer mounting pin includes an elongated stud 24 provided with a head 25 and may have an annular groove 26 just under the head in accordance with good machine practice, in order to insure flat engagement of the head with the inner face of the rotor. Except for the head and recess the stud is of uniform diameter and is provided with a longitudinal bore 30 terminating at its inner end within the stud and opening at its outer end from the end of the stud opposite the head. The stud has a plurality of aligned transverse openings or bores 31 intersecting the longitudinal bore 30 which receive locking balls 32 movable between inward retracted and outward extending positions and the outer ends of the openings are peened over or staked to form shoulders 33 limiting outward travel of the balls.

A sleeve 34 forming the abutment is received over the stud 24 and has an internal recess 35 against the base of which the balls are seated. It is preferred to have about one-third or more of the diameter of the ball projecting outwardly from the stud. This will vary with different sizes of balls. The important consideration is to prevent the ball from falling out of the stud and the larger the diameter the greater proportion thereof will extend from the stud when the parts are in locked position.

The balls are retained in their extended position by means of a plunger 36 mounted for free sliding movement in bore 30. The plunger has an inner section 37 of reduced diameter forming a shoulder 40 and is urged outwardly by a compression spring 41 which engages the inner end of the bore at one end and the shoulder at its opposite end. The outer end of the bore is peened or rolled over at 42 to limit outward travel of the retaining pin.

The pin is provided with an annular recess or groove 43 just inside its outer end, said recess being arcuate in cross-section and having a conical section 44 at its inner end. This conical section forms an effective camming surface for moving the balls to their outward position. Between recess 43 and shoulder 40 there is a shallow annular recess or groove 39 and when the plunger is in its maximum outward position under the influence of spring 41 the balls are seated in this recess and are in sleeve locking position. This latter annular recess which is arcuate in cross section is of great importance in retaining the parts firmly in locked position and withstands movement of the sleeve due to severe shocks. The plunger can be readily moved inwardly of the bore to a releasing position wherein the deep groove or recess 43 is in alignment with the transverse openings or bores 31 by contacting it with a smaller pin and the sleeve can then be moved by camming the balls into recess 43.

The rotor 11 mounts the compressor blades 45 which again have spaced fingers 47 which enter recesses 49. The slightly modified mounting pin 50 is substantially the same as the one earlier described but it has a sleeve 51 provided with a head 52 at its outer end, the sleeve extending the full length of the stud 53 and said sleeve abuts against the head 54 of the stud. The greater diameter of the combined stud and sleeve give the pin greater strength to resist the centrifugal forces which are imposed by the compressor blade.

The sleeve has the same internal annular recess 55 for the balls 56 and the plunger 60 has annular recess 61 with straight camming section 62 and further has the shallow recess 63 to receive the balls when in locked position. A spring 64 urges the plunger outwardly.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined by the appended claims, and that all modifications that come within the meaning and range of equivalency of the claims are intended to be included therein.

What we claim is:

1. In a gas turbine engine of the type having a rotatable mounting wheel and a blade carried thereby, the wheel and blade being provided with complementing fingers having aligned openings formed therein, a mounting pin receivable in the aligned openings for securing the blade to the wheel, said pin comprising: a stud having a head formed on one end thereof, a longitudinal bore terminating at an inner end within said stud and opening at an outer end from the other end of said stud, and aligned transverse bores intersecting said longitudinal bore; a locking ball in each of said transverse bores and movable between retracted and extended positions; an abutment sleeve receivable over said stud and having an internal recess formed therein for engagement by said locking balls when in said extended position; a plunger having adjacent deep and shallow annular grooves formed therein, said plunger being slidably mounted in said longitudinal bore between an inner releasing position wherein said deep groove is aligned with said transverse bores to allow movement of said balls to said retracted position and an outer locking position wherein said shallow groove is aligned with said transverse bores to hold said balls in said extended position; means on the outer end of said longitudinal bore for limiting outward movement of said plunger to said locking position; and a compression spring between the inner end of said longitudinal bore and said plunger for urging said plunger against said means and into said locking position.

2. The mounting pin recited in claim 1 in which said abutment sleeve is receivable over only a portion of said stud at said other end thereof.

3. The mounting pin recited in claim 1 in which said abutment sleeve extends over the full length of said stud and is formed having a head thereon.

4. A rotor blade mounting for gas turbine engines comprising in combination: a rotatable mounting wheel having a plurality of axially spaced, radially extended fingers to define a plurality of spaced recesses; a blade having a plurality of axially spaced, radially extending fingers received in said recesses, said fingers having aligned openings formed therein; a stud receivable in said aligned openings for securing said blade to said wheel, said stud having a head formed on one end thereof, a longitudinal bore terminating at an inner end within said stud and opening at an outer end from the other end of said stud, and aligned transverse bores intersecting said longitudinal bore; a locking ball in each of said transverse bores and movable between retracted and extended positions; an abutment sleeve receivable over said stud and having an internal recess formed therein for engagement by said locking balls when in said extended position; a plunger having adjacent deep and shallow annular grooves formed therein, said plunger being slidably mounted in said longitudinal bore between an inner releasing position wherein said deep groove is aligned with said transverse bores to allow movement of said balls to said retracted position and an outer locking position wherein said shallow groove is aligned with said transverse bores to hold said balls in said extended position; means on the outer end of said longitudinal bore for limiting outward movement of said plunger to said locking position; and a compression spring between the inner end of said longitudinal bore and said plunger for urging said plunger against said means and into said locking position.

References Cited in the file of this patent

UNITED STATES PATENTS

| | | |
|---|---|---|
| 1,635,144 | Stevens | July 5, 1927 |
| 1,777,349 | Cantone | Oct. 7, 1930 |
| 1,864,466 | Peterson | June 21, 1932 |
| 2,399,581 | Spooner | Apr. 30, 1946 |
| 2,515,807 | Spooner | July 18, 1950 |
| 2,765,181 | Butterfield | Oct. 2, 1956 |
| 2,804,798 | Brilmyer | Sept. 3, 1957 |
| 2,816,471 | Bachman | Dec. 17, 1957 |
| 2,819,869 | Meyer | Jan. 14, 1958 |
| 2,901,804 | Williams | Sept. 1, 1959 |

FOREIGN PATENTS

| | | |
|---|---|---|
| 687,507 | Great Britain | Feb. 18, 1953 |
| 989,556 | France | May 23, 1951 |
| 1,097,487 | France | Feb. 16, 1955 |